United States Patent
Tong et al.

(10) Patent No.: US 7,531,929 B2
(45) Date of Patent: May 12, 2009

(54) MAGNETIC FLOATING PAPER TOWEL HOLDER

(76) Inventors: Kun Yuan Tong, 2842 Lowe Ct., Suwanee, GA (US) 30024; John Tsunglin Tong, 2490 American River Dr., Sacramento, CA (US) 95825-7074

( * ) Notice: Subject to any disclaimer, the term of this patent is extended or adjusted under 35 U.S.C. 154(b) by 117 days.

(21) Appl. No.: 11/904,111

(22) Filed: Sep. 26, 2007

(65) Prior Publication Data
US 2009/0079526 A1    Mar. 26, 2009

(51) Int. Cl.
*H02K 7/09* (2006.01)
*H01F 7/02* (2006.01)

(52) U.S. Cl. ............ 310/90.5; 335/306; 446/129; 446/131; 40/661.01; 40/711

(58) Field of Classification Search ......... 310/90.5; 335/306; 446/129, 131; 40/426, 661.01, 40/711
See application file for complete search history.

(56) References Cited

U.S. PATENT DOCUMENTS

| | | | | |
|---|---|---|---|---|
| 3,196,566 A * | 7/1965 | Littlefield | .................. | 40/411 |
| 3,493,274 A * | 2/1970 | Emslie et al. | .............. | 310/90.5 |
| 3,614,181 A * | 10/1971 | Meeks | ........................ | 310/90.5 |
| 4,486,729 A * | 12/1984 | Lee | ............................ | 335/306 |
| D299,396 S * | 1/1989 | Meyer | ........................ | D6/522 |
| 5,182,533 A * | 1/1993 | Ritts | ........................... | 335/306 |
| 5,506,459 A * | 4/1996 | Ritts | ........................... | 310/90.5 |
| 5,589,721 A * | 12/1996 | Han et al. | .................. | 310/90.5 |
| 6,761,610 B2 * | 7/2004 | Fisher et al. | ................ | 446/129 |
| 2008/0163528 A1 * | 7/2008 | Soriano Ramos | ............ | 40/711 |

* cited by examiner

*Primary Examiner*—Ramon M Barrera

(57) ABSTRACT

A magnetic floating paper towel holder consists of a magnetic stand that has magnetic blocks installed at four corners and four sides and a magnetic paper towel holder which has two magnetic wheels and one magnetic connecting tube. The magnetic polarity of the stand magnetic blocks, the magnetic wheels and the magnetic connecting tube is properly arranged to create a repelling force against each other between the stand magnetic blocks and the magnetic paper towel holder. Therefore, the magnetic paper towel holder floats in air when it is placed on top and in the middle of the magnetic stand.

10 Claims, 2 Drawing Sheets

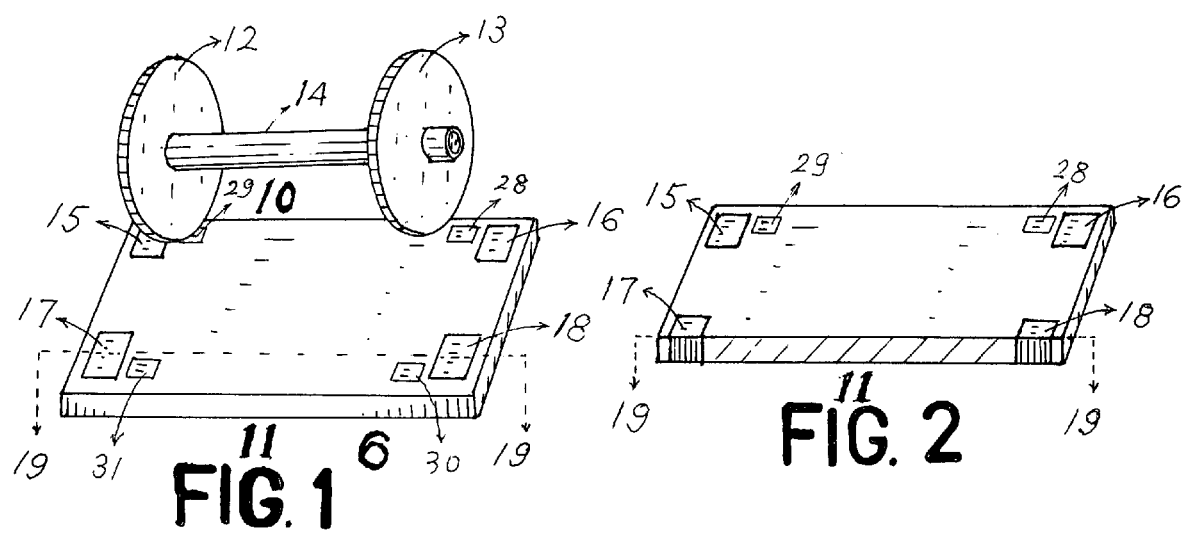
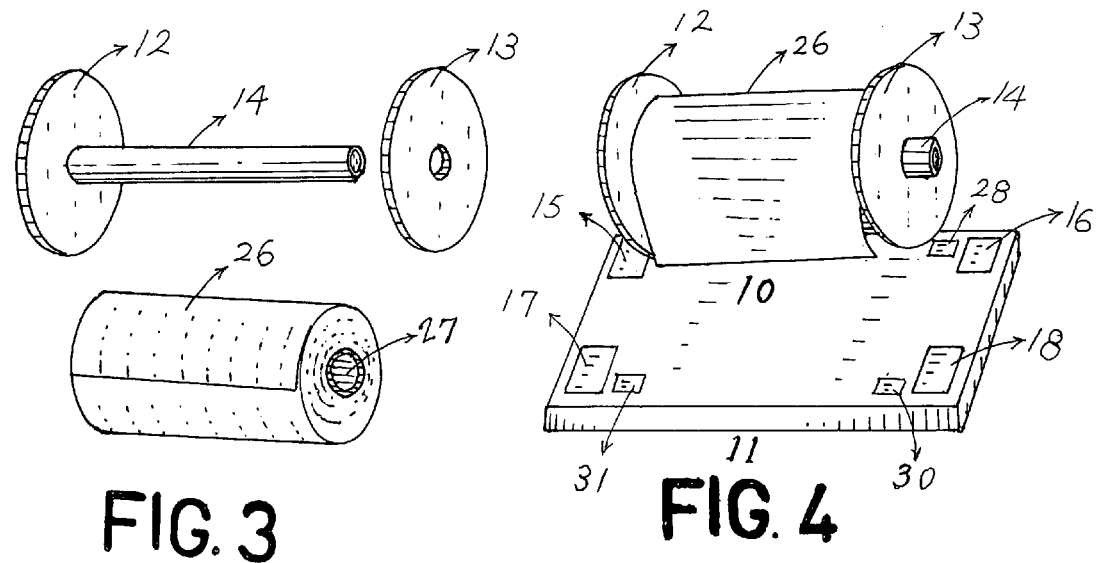

MAGNETIC FLOATING PAPER TOWEL HOLDER

THE BACKGROUND OF THE INVENTION

Some of the paper towel holder on the market have to be nailed on the wall or cabinet and some have sticks on stands to hold the paper towel. The present invented magnetic floating paper towel holder floats in air by magnetic force.

THE BRIEF DESCRIPTION OF THE INVENTION

Magnetic floating paper towel holder consists of a magnetic stand that has magnetic blocks installed at four corners and a paper towel holder that has two magnetic wheels and a magnetic connecting tube. The magnetic polarity of the stand magnetic blocks and the magnetic wheels is properly arranged to create a repelling force against each other between the stand magnetic blocks and two magnetic wheels to cause the magnetic paper towel holder to float in air. One can grasp the magnetic paper towel holder in air and tear a piece of paper towel and then put the magnetic paper towel holder back on top of the magnetic stand to float in air. The magnetic stand can be put on top of a table or hidden under the table top to be invisible.

THE DETAILED DESCRIPTION OF THE DRAWINGS

FIG. 1. is a perspective view of a magnetic floating paper towel holder which consists of a magnetic stand which has magnetic blocks and a magnetic paper towel holder which has two magnetic wheels and a magnetic connecting tube.

FIG. 2 is a dissection view of two magnetic blocks of a magnetic stand.

FIG. 3 is a perspective view of two magnetic wheels, a magnetic connecting tube and a roll of paper towel.

FIG. 4 is a perspective view of a magnetic floating paper towel holder that has one roll of paper towel in place.

THE DETAILED DESCRIPTION OF THE INVENTION

Figure 5:
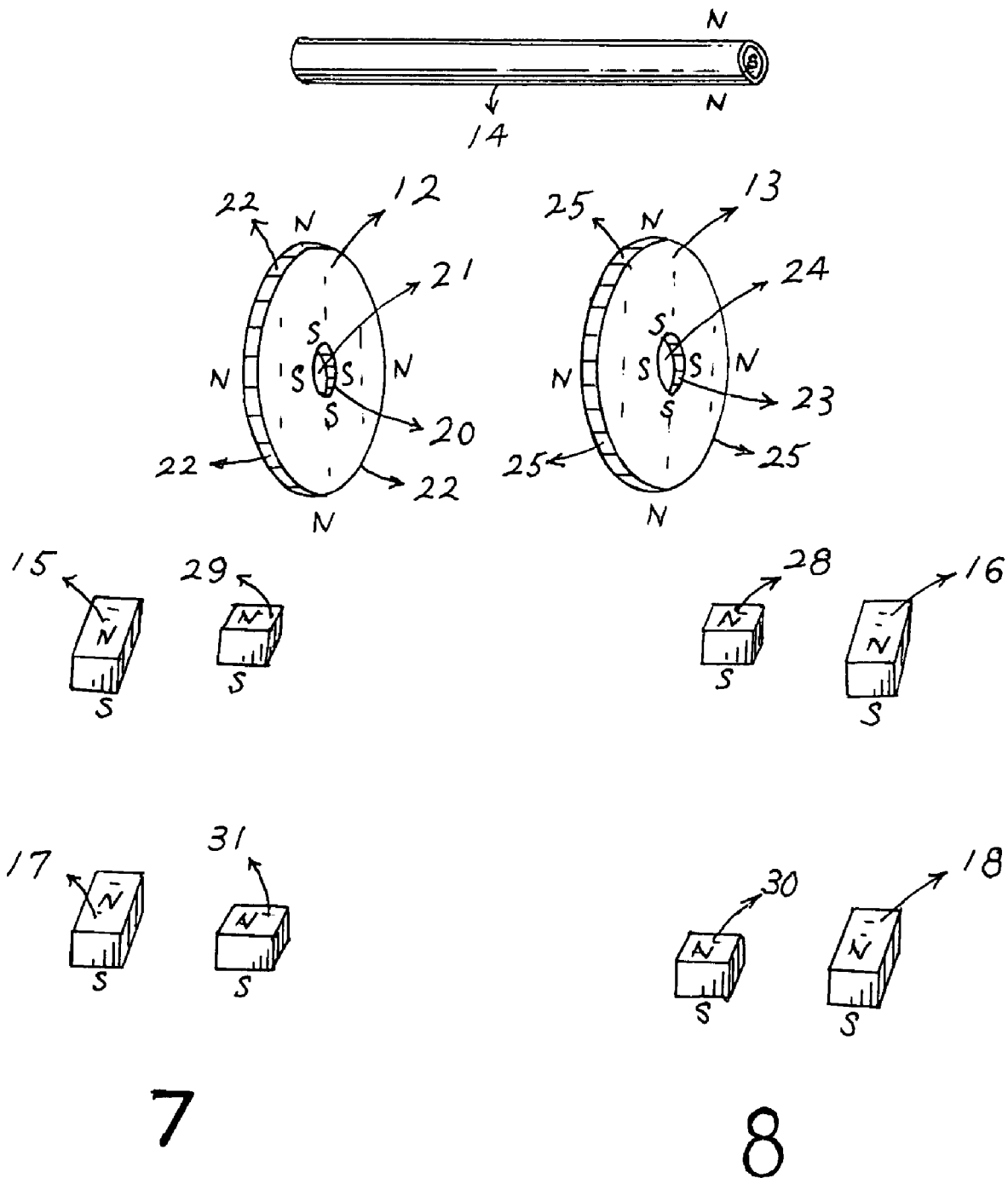
FIG. 5 is a perspective view of magnetic wheels, magnetic connecting tube and magnetic blocks.

Referring now in detail to the drawings, numeral 6 of FIG. 1 is a magnetic floating paper towel holder that consists of a magnetic paper towel holder 10 and a magnetic stand 11. The magnetic paper towel holder 10 consists of two magnetic wheels 12 and 13, a magnetic connecting tube 14 as illustrated in FIGS. 1, 3 and 4. Numeral 15, 16, 17, 18, 28, 29, 30 and 31 of FIGS. 1, 2, 4 and 5 are magnetic blocks that are installed at each corner of magnetic stand 11. The dissection line 19 of FIGS. 1 and 2 illustrates two dissected magnetic blocks 17 and 18. One magnetic wheel 13 of the magnetic paper towel holder 10 is removed from the magnetic connecting tube 14 in order to insert magnetic connecting tube 14 into the central canal 27 of a roll of paper towel 26 as illustrated in FIG. 3. The magnetic polarity of magnetic wheels 12 and 13 and magnetic blocks 15, 16, 17, 18, 28, 29, 30 and 31 of magnetic stand 11 is properly arranged to create a repelling force against each other between magnetic blocks 15, 16, 17, 18, 28, 29, 30 and 31 and magnetic wheels 12 and 13. Therefore, the magnetic paper towel holder 10 floats in air by magnetic force on top of the magnetic stand 11 as illustrated in FIGS. 1 and 4. The magnetic wheel 12 of FIG. 5 has a negative (S) magnetic pole at the inner rim 20 of inner hole 21 and a positive (N) magnetic pole at the outer peripheral rim 22 or vise versa. The magnetic wheel 13 of FIG. 5 has a negative (S) magnetic pole at the rim inner 23 of the central hole 24 and a positive (N) magnetic pole at the outer peripheral rim 25 or vise versa. The magnetic connecting tube 14 has a positive (N) magnetic pole at its outer surface and a negative (S) pole at inner surface in order to create a repelling force against the magnetic blocks 15, 16, 17, 18, 28, 29, 30 and 31. Numerals 7 and 8 of FIG. 5 is a possible arrangement of the magnetic field where magnetic wheels 12 and 13, magnetic connecting tube 14 and the magnetic blocks 15, 17, 29 and 31 have positive (N) magnetic poles facing each other to create repelling force against each other.

The invention claimed is:

1. A magnetic floating paper towel holder comprising a magnetic stand and a magnetic paper towel holder.

2. The magnetic floating paper towel of claim 1 wherein said magnetic stand has magnetic blocks at the corners of said magnetic stand.

3. The magnetic floating paper towel holder of claim 2 wherein said magnetic stand has magnetic blocks at the sides of said magnetic stand.

4. The magnetic floating paper towel holder of claim 1 wherein said magnetic paper towel holder has two magnetic wheels.

5. The magnetic floating paper towel holder of claim 4 wherein said magnetic paper towel holder has a magnetic connecting tube connecting said two magnetic wheels.

6. A magnetic floating paper towel holder comprising a magnetic stand and a magnetic paper towel holder with magnetic polarities of said magnetic stand and said magnetic paper towel holder arranged to create a repelling force between said magnetic stand and said magnetic paper towel holder causing said magnetic paper towel holder to float in air.

7. The magnetic floating paper towel holder of claim 6 wherein said magnetic stand has magnetic blocks at the corners of said magnetic stand.

8. The magnetic floating paper towel holder of claim 7 wherein said magnetic stand has magnetic blocks at the sides of said magnetic stand.

9. The magnetic floating paper towel holder of claim 6 wherein said magnetic paper towel holder has two magnetic wheels.

10. The magnetic floating paper towel holder of claim 9 wherein said magnetic paper towel holder has a magnetic connecting tube connecting said two magnetic wheels.

* * * * *